United States Patent [19]
Joyce

[11] Patent Number: 5,854,869
[45] Date of Patent: Dec. 29, 1998

[54] STRESS REDUCED LASER MODULE

[75] Inventor: William B. Joyce, Basking Ridge, N.J.

[73] Assignee: Lucent Technologies Inc., Murray Hill, N.J.

[21] Appl. No.: 887,916

[22] Filed: Jul. 3, 1997

[51] Int. Cl.⁶ .................................................. G02B 6/42
[52] U.S. Cl. .............................................. 385/92; 385/94
[58] Field of Search ................................ 385/88, 91, 92, 385/94

[56]     References Cited

U.S. PATENT DOCUMENTS 4,752,109   6/1988   Gordon et al. ........................... 385/14

OTHER PUBLICATIONS

"Alignment of Gaussian Beams", W. B. Joyce et al, Applied Optics, vol. 23, No. 23, pp. 4187–4196, Dec. 1984.

*Primary Examiner*—John D. Lee
*Assistant Examiner*—Juliana K. Kang

[57]      ABSTRACT

A module which holds an optical fiber and a laser in alignment to couple light energy emitted from the laser to an end of the fiber. The fiber is held within a metal ferrule. The fiber and the laser are aligned by means of a metal platform to which both the ferrule and the laser are secured. Only the ferrule is secured to the outer box of the module, so that the platform, along with the alignment of the fiber and the laser, are isolated from mechanical stresses induced in the box.

5 Claims, 3 Drawing Sheets

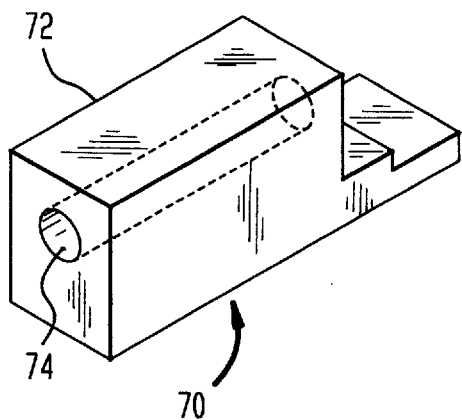
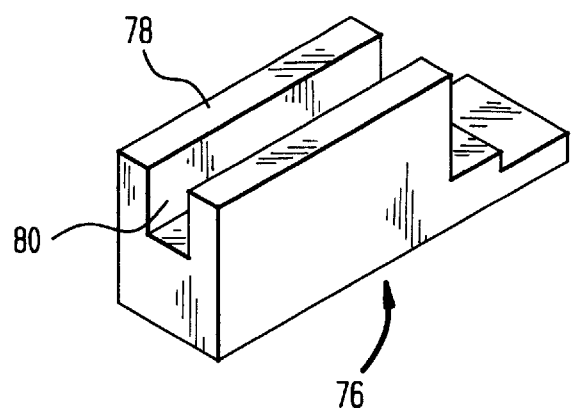
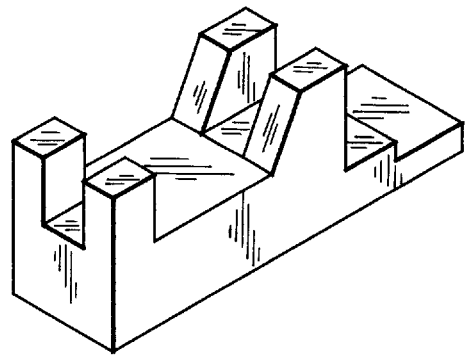
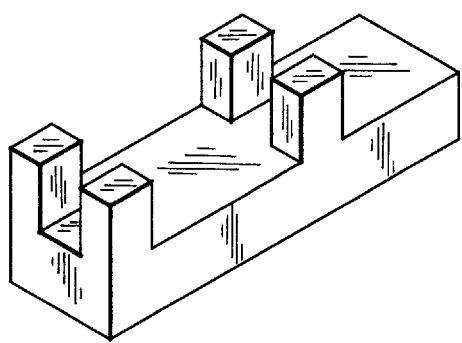
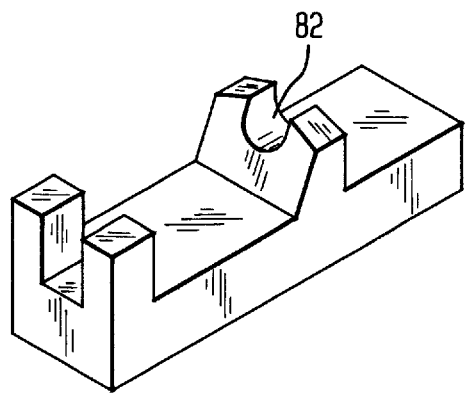

STRESS REDUCED LASER MODULE

BACKGROUND OF THE INVENTION

This invention relates to laser modules and, more particularly, to an improved design for such a module wherein mechanical stresses induced in the module housing are isolated from interfering with alignment of a laser and optical fiber within the housing.

The present invention was conceived during the design of a laser module for use in undersea fiber optic cables. Such a module includes a platform in a box. The platform holds an optical fiber in alignment with a laser. The fraction of the optical power from the laser that enters the useful mode of the fiber is called the "coupling efficiency" (CE). Undesired stress in a laser module moves the fiber relative to the laser to change the coupling efficiency. In the short term, stress causes rework and reduces the manufacturing yield because the coupling efficiency changes when a module cools down from a soldering or welding operation and because the coupling efficiency changes when forces are applied to the module (e.g., when sealing the module lid, mounting the module to a chassis or board, etc.). In the long term, stress causes degradation of the coupling efficiency. It would therefore be desirable to provide a laser module of the type described wherein the platform and the alignment of the laser with the fiber are isolated from mechanical stresses induced in the housing.

SUMMARY OF THE INVENTION

According to the present invention, there is provided a module for holding an optical fiber and a laser in alignment to couple light energy emitted from the laser to an end of the fiber. The module includes a housing having a first opening along one of its sides for providing access to the interior of the housing and a second opening through an end of the housing for allowing passage of the fiber into the housing interior. A cover seals the first opening of the housing. A metal ferrule surrounds the fiber and extends through the second opening of the housing to the interior of the housing, the ferrule being secured to the housing. A metal platform is provided which is supported by the ferrule so that the platform is not directly secured to the housing. The platform has a base portion extending substantially parallel to the fiber and a support portion extending from the base portion beyond the end of the fiber. Laser support structure is secured to the platform support portion for supporting the laser in alignment with the end of the fiber. Accordingly, the platform is indirectly secured to the housing so that the platform and the alignment of the laser are isolated from mechanical stresses induced in the housing.

BRIEF DESCRIPTION OF THE DRAWINGS

The foregoing will be more readily apparent upon reading the following description in conjunction with the drawings in which like elements in different figures thereof are identified by the same reference numeral and wherein:

FIGS. 4A, 4B, 4C, 4D and 4E show other embodiments of platform structure.

DETAILED DESCRIPTION

Figure 1:
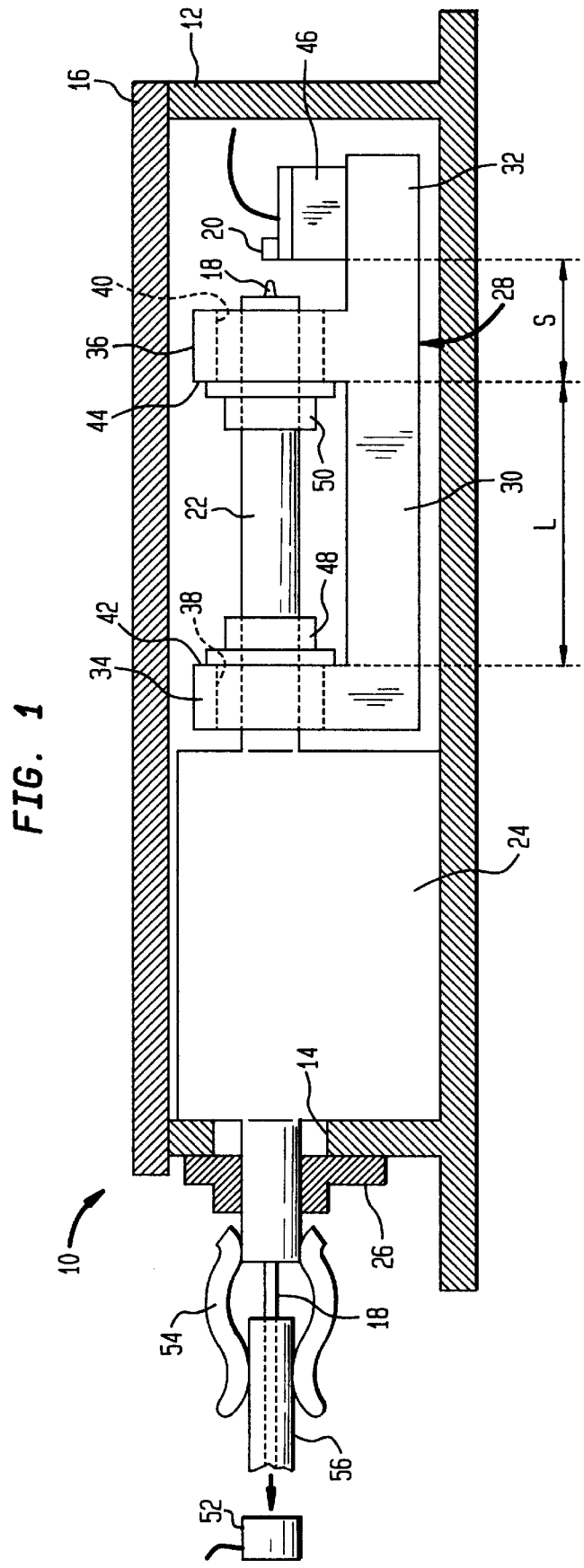
FIG. 1 is a schematic cross sectional view illustrating a first embodiment of a laser module constructed in accordance with this invention.

Laser modules, particularly welded modules for use in undersea fiber optic cables, typically exhibit certain design limitations. Some of these limitations are as follows:

Tight (fractional micron) transverse tolerances in assembly lead to expensive manufacture (costly equipment, low throughput, reduced yield, frequent rework and hand tweaking) and even detuned lens design to sacrifice high coupling efficiency in favor of reduced manufacturing tolerances.

Residual mechanical stresses that cause short term yield reduction and long term degradation of coupling efficiencies. These stresses come from both thermal expansion coefficient mismatch (which is sometimes partially corrected in a design by matching the expansion coefficients along selected axes) and from manufacturing temperature gradient stress (hot welds with cold ferrules, etc.) that cannot be compensated with expansion coefficient matching and are rarely if ever compensated in the art.

A design such that the alignment of the ferrule relative to the laser is easily degraded by mounting stresses on the box, such as when the box is screwed down.

A platform structure that is not overly rigid and that relies to a greater or lesser extent on its attachment to the box for its rigidity.

A ferrule that is held over a short section of its length, somewhat like holding a long pole in one fist. The resulting position of the pole end is thus easily moved by stresses.

An inherent conflict in that there are usually one or more parts that are, on the one hand, supposed to be as rigid as possible for coupling efficiency stability and yet are, on the other hand, supposed to be somewhat malleable so that final reworking, bending and tweaking can be used to correct for the fact that the tolerances are so tight that a high yield, untweaked, process is expensive or, more typically, impossible.

The foregoing limitations are addressed by the inventive design, which relies on relaxed tolerances to permit the use of rigid parts and produce a high yield, untweaked, manufacturing process.

It is the transverse tolerances which are the source of the problem because they are only a small fraction of a micron in a typical laser. The axial tolerance is not nearly so tight. The angular tolerances (i.e., the tilt of the ferrule) are quite large. In the article "Alignment of Gaussian Beams" by W. B. Joyce and B. C. DeLoach, Applied Optics, Vol. 23, No. 23, pages 4187–4196, December 1984, these tolerances have been quantified and it has been shown that there is a fundamental tolerance limit given by the second law of thermodynamics. This law states that if the coupling efficiency is not to be detuned away with reduced coupling efficiency lenses, then increased transverse tolerance can be achieved only by decreasing the (typically great) angular tolerance. This has been done in the art by optical methods, for example, by increasing the beam size within the laser (expanded beam laser) or by external optics. According to the present invention, however, this is done mechanically and without modification of the laser and without any special optics.

Referring now to the drawings, FIG. 1 illustrates a first embodiment of a module constructed according to the present invention. The module, designated generally by the reference numeral 10, includes a housing 12 which has an opening along its top side (as viewed in FIG. 1) for providing access to the interior of the housing 12, and an opening 14 through an end of the housing 12 for allowing passage of the fiber into the housing interior. After the module 12 has been assembled, as will be described hereinafter, the top opening of the housing 12 is sealed by a cover 16 by welding or the like.

The purpose of the module 12 is to maintain in alignment and protect from the environment an optical fiber 18 and a laser 20. The optical fiber 18 is held within a metal ferrule 22 which extends through the opening 14 to the exterior of the housing 12. As illustrated, the ferrule 22 includes an enlarged block-like portion 24 which is secured to the housing 12, illustratively by welds along its lower surface. Further, at the exterior of the housing 12, a washer 26 surrounds the ferrule 22 and is welded to the ferrule 22 and the housing 12, thereby sealing the opening 14.

As shown, alignment between the fiber 18 and the laser 20 is maintained by the platform 28 which is secured to and supported by the ferrule 22, thereby isolating the platform 28 from the housing 12. The platform 28 includes a base portion 30 which extends substantially parallel to the fiber 18 and a support portion 32 extending from the base portion beyond the end of the fiber 18. Securement structure 34, 36 is integral with, and extends away from, the base portion 30. The securement structure 34, 36 has a receiving cavity in the form of bores 38, 40 for receiving the ferrule 22 therein. The securement structure 34, 36 further has a pair of spaced apart surfaces 42, 44 transverse to the length of the fiber 18 and each adjacent a respective open end of a bore 38, 40. Secured to the support portion 32 is laser support structure 46 which supports the laser 20.

According to the present invention, the ferrule 22 is secured to the platform 28 by means of the washers 48, 50 which are each welded to the ferrule 22 and a respective surface 42, 44. According to the present invention, the order of welding the parts is important. The first and second welds are the welds of the laser support structure 46 to the support portion 32 and the washer 50 to the ferrule 22 and the wall 44. These welds can be performed in either order and provide for the coarse alignment of the fiber 18 and the laser 20. During the welding process, the optical sensor 52, which detects the light output from the fiber 18, is utilized for measuring the alignment. The next weld is of the washer 48 to the surface 42. This provides the fine alignment. The ratio of the distances L and S shown in FIG. 1 provides a mechanical advantage during the welding of the washer 48 to achieve the final alignment. The next weld is the welding of the bottom of the ferrule block 24 to the housing 12. Next, the washer 26 is welded to the housing 12 and the ferrule 22. Finally, the clip 54 is welded to the ferrule 22 and pinched to the pigtail 56.

The relatively large gap between the walls 42, 44 provides working room for the welder as well as providing the mechanical advantage L/S. The laser 20 is protected from welding splatter by having the washer 50 on the opposite side of the securement structure 36 from the laser 20 and/or by welding the laser support structure 46 after welding the washer 50. The latter is possible because both are followed by the fine alignment weld of the washer 48. A further advantage is that the welding of the washers 48 and 50 is effected by sharing a common space for welder access.

In a preferred process, the ferrule 22 is positioned for the weld of the washer 50 in such a way that it is rotated about an imaginary point in space such as the center of the bore 38 or the center of the opening 14. Importantly, the order of the steps of welding the washer 50 and the laser support structure 46 may be reversed in the present design for the following reason—think of the ferrule 22 as a lever arm casting an optical waist on the face of the laser 20 (were the light to propagate backward in the fiber 18.) The tolerances for the positioning of the ferrule 22 at the surface 44 are much more than an order of magnitude looser than is usually the case because the fine adjustment of the position of the optical waist of the fiber 18 is not made until the third step in the fastening process. (That is why the order of the first two steps may be reversed.) The final positioning of the ferrule's waist (step three) is also a loosened tolerance step because of the mechanical advantage of the system. Specifically, the third step transverse tolerances are increased by the mechanical advantage L/S, where this ratio might range from one to ten in typical embodiments. As the ferrule 22 is tilted to make the ferrule waist fall upon the laser's active stripe, the angle of the ferrule changes, and it is here that the generous angular tolerance, as qualified in the aforereferenced article, is exploited to trade angular tolerance for transverse tolerance.

Because the ferrule 22 and the platform 28 may be made of dissimilar metals, there may be a thermal coefficient mismatch. Accordingly, the washer 48 is sufficiently thin so as to be flexible. This flexibility allows the washer 48 to compensate axially along the fiber 18 for the thermal coefficient mismatch. In addition, the flexibility of the washer 48 reduces any stress that comes from the welding which heats the ferrule 22 and the platform 28 to different temperatures.

Figure 2:
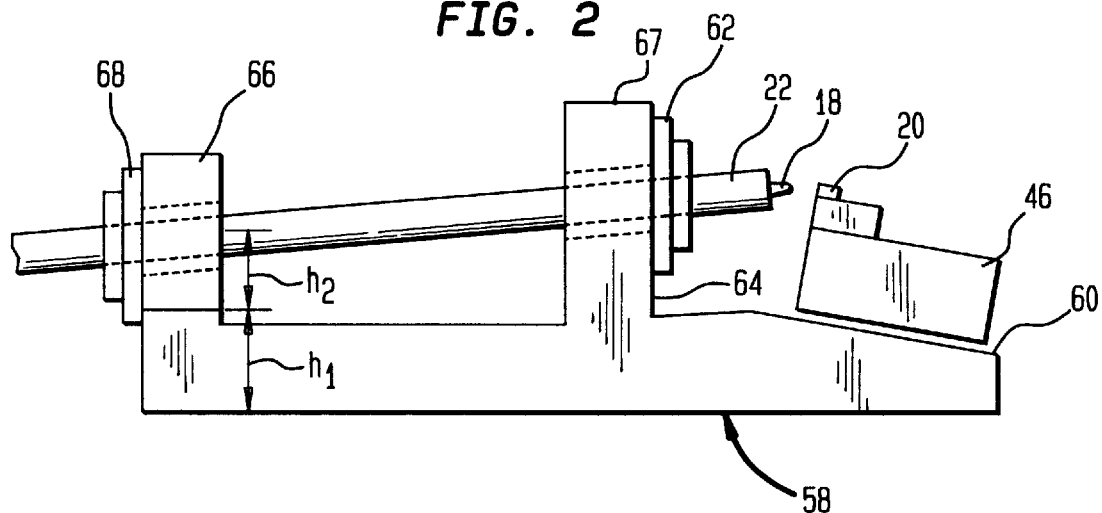
FIG. 2 is a side view illustrating an alternate embodiment of the platform.

FIG. 2 illustrates an alternate embodiment of a platform 58 having two modifications to the platform 28 (FIG. 1). The first modification is a ramp 60 (shown in exaggerated angle) under the laser support structure 46. This arrangement may be useful when the welding of the washer 62 to the surface 64 is not adjustable in height, and in this case use is made of the angular tolerance of the alignment.

In addition, as shown in FIG. 2, the platform 58 is arranged to achieve transverse thermal expansion matching. The objective is to have the temperature coefficient of the fiber waist position in the vertical direction match that of the laser support structure 46 as they both move with temperature. For a given thermal expansion coefficient of the material forming the upper portion of the securement structure 66, or alternatively the securement structure 67, (which may be chosen from a reasonably wide range) the heights $h_1$ and $h_2$ are adjusted to achieve this vertical direction matching. With transverse temperature expansion matching by this method and with axial stress relief from a flexing washer 68 and with a cantilevered platform 58, stress sources such as thermal expansion coefficient mismatches, thermal gradients during fastening and applied external forces are all addressed without any thermal expansion material matching and without the need to choose materials on an expansion matching basis.

Figure 3A:
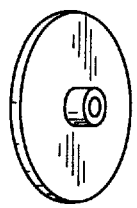
FIGS. 3A, 3B and 3C illustrate different embodiments of mounting washers used in securing the ferrule to the platform.
Figure 3B:
Figure 3C:
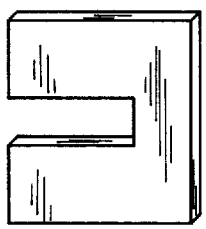

FIGS. 3A, 3B and 3C illustrate some alternative mounting washer designs. One of the mounting washers should be relatively thin to provide axial flexibility, for the reasons discussed above.

FIGS. 4A, 4B, 4C, 4D and 4E illustrate various alternate embodiments for the platform. While the platforms shown in FIGS. 1 and 2 have bores through the securement structure to define the receiving cavity for the ferrule, the platform 70 shown in FIG. 4A has a single substantially rectilinear block 72 functioning as the securement structure with a throughbore 74 defining the receiving cavity for the ferrule. The surfaces for attachment of the mounting washers are at opposite ends of the bore 74.

The platform 76 shown in FIG. 4B includes a substantially rectilinear block 78 integral with the platform base portion and the receiving cavity for the ferrule is-formed as an open channel 80 in the block 78. The surfaces for welding of the mounting washers are on the block 78 at opposite ends of the channel 80.

FIGS. 4C, 4D and 4E illustrate further platform embodiments wherein the securement structure for the ferrule comprises a pair of blocks integral with the platform base portion, with each of the blocks being formed with a respective notch which is open opposite the platform base portion so that the open notches together define the receiving cavity for the ferrule. In the embodiment shown in FIG. 4E, the open notch 82 is designed for the ferrule 22 to be secured directly thereto, without a mounting washer.

Accordingly, there has been disclosed an improved design for a laser module wherein mechanical stresses induced in the module housing are isolated from interfering with alignment of the laser and optical fiber within the housing. While several embodiments of this invention have been disclosed herein, it is understood that various adaptations to the disclosed embodiments are possible and will be apparent to one of skill in the art, and it is intended that this invention be limited only by the scope of the appended claims. Thus, while welds have been described, other types of fastening, such as by soldering or the use of an appropriate adhesive material, may also be utilized.

What is claimed is:

1. A module for holding an optical fiber and a laser in alignment to couple light energy emitted from said laser into an end of said fiber, the module comprising:

a housing having a first opening along one side of said housing for providing access to the interior of said housing and a second opening through an end of said housing for allowing passage of said fiber into said housing interior;

a cover for sealing said first opening of said housing;

a metal ferrule surrounding said fiber and extending through said housing second opening to the interior of said housing, said ferrule being secured to said housing;

a metal platform supported by said ferrule so that said platform is not directly secured to said housing, said platform having a base portion extending substantially parallel to said fiber and a support portion extending from said base portion beyond the end of said fiber; and laser support structure secured to said platform support portion for supporting said laser in alignment with the end of said fiber;

whereby said platform and the alignment of said laser with said fiber are isolated from mechanical stresses induced in said housing.

2. The module according to claim 1 wherein said platform includes integral securement structure extending away from said base portion, said securement structure having a receiving cavity with two open ends for receiving said ferrule therein and a pair of spaced apart surfaces transverse to the length of said fiber, each of said pair of surfaces being adjacent a respective open end of said receiving cavity, and wherein said ferrule is secured to said pair of surfaces;

whereby said ferrule may first be secured to the one of the two surfaces which is closer to the laser support structure for coarse alignment of the fiber with the laser and then secured to the other of the two surfaces for more precise alignment of the fiber with the laser.

3. The module according to claim 2 wherein said securement structure comprises a substantially rectilinear block integral with said platform base portion and said receiving cavity is formed as a bore through said block, said pair of surfaces being on said block at opposite ends of said bore.

4. The module according to claim 2 wherein said securement structure comprises a pair of blocks integral with said platform base portion, each of said blocks having a respective one of said surfaces thereon, and each of said blocks being formed with a respective notch which is open opposite said platform base portion, said open notches together defining said receiving cavity.

5. The module according to claim 2 wherein said securement structure comprises a substantially rectilinear block integral with said platform base portion and said receiving cavity is formed as an open channel in said block, said pair of surfaces being on said block at opposite ends of said channel.

* * * * *